2 Sheets—Sheet 1.

F. A. SAWYER, 2d.
Carriage-Step.

No. 220,667.     Patented Oct. 14, 1879.

WITNESSES

INVENTOR—

Francis A. Sawyer 2d

F. A. SAWYER, 2d.
Carriage-Step.
No. 220,667.  Patented Oct. 14, 1879.
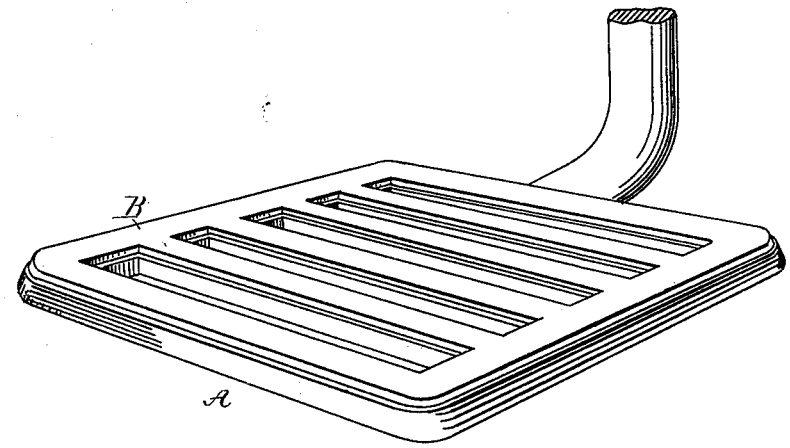
Fig. 6.
 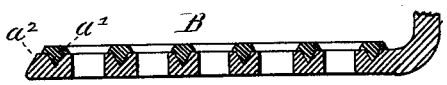
Fig. 7.  Fig. 8.
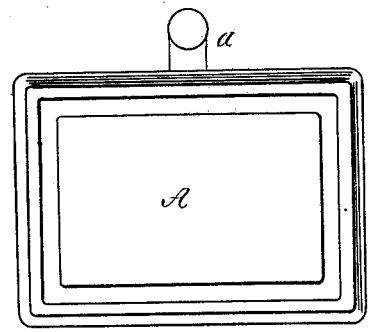
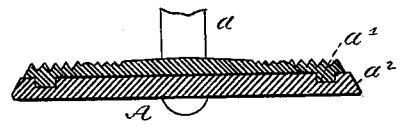
Fig. 9.
WITNESSES.  Francis A. Sawyer 2d
F. A. Raymond 2d  INVENTOR.
Geo. H. Walker

UNITED STATES PATENT OFFICE.

FRANCIS A. SAWYER, 2D, OF BOSTON, MASSACHUSETTS, ASSIGNOR TO THE RUBBER STEP MANUFACTURING COMPANY.

IMPROVEMENT IN CARRIAGE-STEPS.

Specification forming part of Letters Patent No. 220,667, dated October 14, 1879; application filed April 21, 1879.

*To all whom it may concern:*

Be it known that I, FRANCIS A. SAWYER, 2d, of Boston, in the county of Suffolk and Commonwealth of Massachusetts, have invented an Improvement in Carriage Steps and Pads, of which the following is a specification.

This invention relates to that class of carriage-steps known as the "rubber" or "elastic" step, which comprises generally a metal plate and a rubber covering vulcanized thereto, or a separately-molded pad adapted to entirely cover the said plate.

It consists in a metal plate having a depressed panel and a shank, a molded resilient pad vulcanized to a shape which shall adapt it to fit the recess or panel in the metal plate, and in means for securing it to said plate, all of which will hereinafter be more fully described.

Heretofore elastic carriage-steps have generally been made by vulcanizing the rubber tread directly to the metal supporting-plate. This construction, however, while insuring a nice article, is expensive, in that it requires that the metal supporting-plate be cast, be detachable from its shank, and be subjected to a variety of manipulations, such as straightening, beveling the edge, drilling and countersinking the holes into which the rubber is molded and vulcanized, and planing the shank-receiving recess, and various other manipulations.

I have ascertained that the metal plate and shank can be forged in one piece, and that the same can be provided with a depressed portion upon its upper surface, into which a molded tread of rubber or other suitable material can be cemented.

I have also ascertained that a tread secured therein by cement, preferably having white or red lead as a base, is very firmly fastened to the plate, as the joint between the under surface of the tread and the upper surface of the metal is protected and the joint sealed by the metal wall which, at the same time, protects the edge of the tread.

Figure 1:
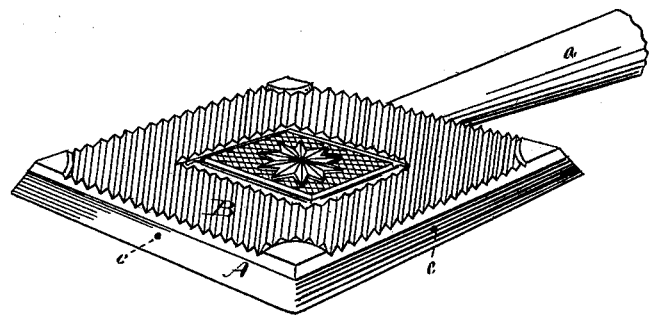
Figure 2:
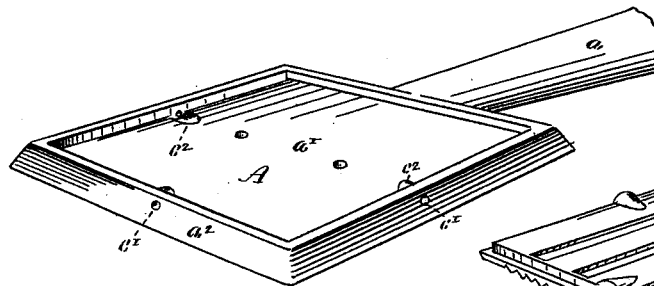
Figure 3:
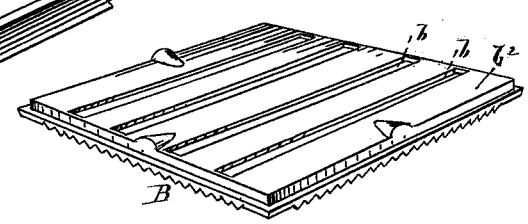
Figure 4:
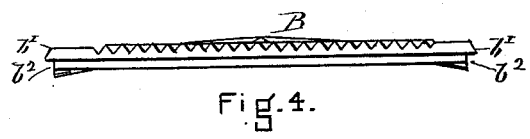
Figure 5:
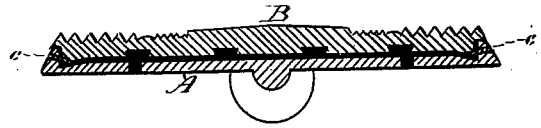

In the drawings, Figure 1 is a perspective of my invention. Fig. 2 is a perspective of the metal supporting-plate, showing the panel, protecting-wall, and short shank. Fig. 3 is a perspective of molded tread reversed. Fig. 4 is an edge view of the tread; and Fig. 5 is a cross-section of the tread and plate. Fig. 6 is a perspective of a gridiron-step with an improved tread. Figs. 7 and 8 are cross-sections thereof. Fig. 9 represents a plan and cross-section of a modification in construction.

A represents the forged metal step, which is provided with a short shank, $a$, the depressed panel $a^1$, and the exterior wall, $a^2$.

The inner surface of the wall should be as nearly vertical as possible, and the upper surface of the panel may be roughened to secure a better adhesion of the cement thereto. From the panel molds are prepared which have dimensions corresponding generally to those of the panel, so that the tread shaped thereby shall correspond in length and width to the length and width of the panel and fit the same. Of course the upper surface of the molded pad may have any desirable configuration. It is important, however, that the lower portion should be so shaped as to completely fill the panel.

I prefer that the tread B be vulcanized to a canvas or other fibrous backing of one or more thicknesses, or to a metal plate. The under surface may be provided with undercut or other shaped recesses $b$, either extended from edge to edge, or otherwise located.

The pad may further be provided with a projecting portion, $b^1$, adapted to rest upon the top of the wall $a^2$. The portion $b^2$, or that part below the lip or projection $b^1$, is that which fits within the recess or panel in the metal supporting-plate inclosed by the wall $a^2$, and it of necessity must be formed in molds which have the general dimension of the recess bounded by this wall. Therefore the size of the recess is first determined upon. The metal plate or step provided with such a sized recess and the mold in which the tread is shaped is provided with a corresponding size—that is, the tread is molded not to fit any recess, but to fit a particular recess prepared specially to receive it.

In lieu of a fibrous backing, a mixture of vulcanizable stock and iron filings may be employed to form the lower surface of the pad, to which an upper portion of more resilient stock may be united by vulcanization.

It is intended that the tread be fastened to the carriage-step after the shank $a$ has been welded to the carriage arm or bracket. The upper surface of the panel and wall and the inner edge of the wall are covered with the cement. The rubber pad is then laid thereon and forced into the panel by any suitable pressure. A joiner's vise will answer for this purpose. This pressure should be maintained until the cement has had time to properly set or harden.

A stronger union between the iron and the pad is obtained when the under surface of a pad is roughened, or provided with recesses as above explained, as a cementing-surface of greater area is presented. Although the metal plate may in some instances be perforated, yet it is desirable that the cementing-surface should be as large and as continuous as possible.

In lieu of applying a cement when the tread is about to be fastened to the plate, I may cover the upper surface of my metal plate, or the under surface of the tread, with a layer of insoluble cement, which requires to be heated for use. Pitch and gutta-percha in equal parts fused makes a very good cement for this purpose.

This method enables me to supply the fastening medium with the step in a practical way, as it allows the manufacturer to furnish the carriage-maker with a step so prepared that it requires but the application of heat to the metal plate to prepare it for the reception of the tread. Of course any hard cement, non-adhesive at ordinary temperatures, and which requires to be heated immediately prior to its use, can be used in this manner.

The use of such a cement enables the manufacturer or user to readily remove a tread which has become worn, or which does not possess the desired ornamentation without injury, and without wasting the cement, and allows the ready insertion and fixation without more preparation of another tread in its place.

An all-rubber tread can be fastened to its metal support by the gutta-percha and pitch cement.

Metal pins $c$, driven through holes $c^1$ in the wall into the tread, may be used in connection with the cement in securing it to the panel, in which case it is desirable to provide a panel with recesses $c^2$, into which the holes $c^1$ enter, and to so incline said holes and mold the rubber tread that portions shall fit within said recesses, so that the pins may be cramped against the upper surface of the recess as they are inserted.

In lieu of pins, when a metal plate is employed studs may be cast thereon, or otherwise secured thereto, to project downwardly into holes made to receive them, extending from the panel through the plate, and, preferably, countersunk on the under side; in which case, in fastening the tread to the panel the studs would be spread to fill, or partially fill, the countersunk holes.

In place of studs cast or secured to the metal re-enforcing plate to which the tread is vulcanized or fastened before it is attached to the foundation-plate or step proper, a bolt may be employed; in which case but one hole would be necessary in the metal supporting-plate, and that at the center. The bolt is fastened to the plate in any desirable manner at about its center, and must be long enough to project beyond the under surface of the step, to receive the fastening-nut when the tread is adjusted thereon. When this construction is employed, or, in fact, when any construction is used which does not include the use of cement, it is preferable that the tread be made somewhat concave upon its lower surface, in order that in fastening it firmly to the step within the wall the tread may be flattened and spread laterally from the center against the wall, so as to firmly seal the vertical joint which occurs between its inner edge and the side edge of the tread.

The metal fastenings, when used in connection with cement, serve to hold the tread to the plate while the cement is setting, and afterward assist in the fastening and prevent the displacement of the tread by lateral thrusts, which might cause the breakage of the cement. Of course these metal fastenings could be used without the cement if desirable.

A modification in construction is shown in Fig. 9, in which the metal supporting-plate is provided with a recess upon its upper surface parallel with its edge, but adjacent thereto, in place of depressing the entire inclosure. In this case, of course, the formed tread is provided with a portion which fits within the recess. It is fastened to the plate by cement applied to the recess and surface of the plate within the recess, and by metal fastenings, or by either, as desired.

On some accounts this is a cheaper construction, as less material is employed in making the tread, the portion of the plate inclosed by the recess taking the place of that part of the tread in the first-mentioned construction.

In Figs. 6, 7, and 8 I show the application of my invention to the steps known as the book or gridiron, for hacks and other carriages. These steps, being large, are generally made with recesses between the bars. The tread is secured in recesses in the bars in the manner above explained.

The advantage in the use of this invention over the other forms of elastic carriage-steps known is that of economy in manufacture. By its use the manipulations necessary in preparing a malleable casting, to which the rubber is vulcanized, to the mold is avoided, and the expensive processes for making the step detachable from the shank, in order that the short arm or bracket may be welded without injuring the rubber, are done away with, and I can employ a forged step and shank in lieu of the malleable casting.

Another advantage arises from the fact that a worn-out tread can very easily be replaced by a new one without removing the metal supporting-plate from the carriage.

The essential elements of this invention consist in the metal supporting-plate having a short shank, a panel which is adapted to receive the elastic tread, and a wall which shall act as a seal in covering the cement-joint, and in a formed tread of a shape that shall fit the panel in the step in the manner set forth, and be cemented or fastened thereto, as indicated.

It will be noticed that in order to insure permanency to the joint between the rubber tread and foundation-plate it is important, first, that the surface to which the rubber tread is cemented should be continuous; second, that the joint should be protected at its edge by a wall integral with the foundation-plate and extending upwardly around the edge of the tread.

Having thus fully described my invention, I claim and desire to secure by Letters Patent of the United States:

1. The combination of a metal step having the panel $a^1$, a wall, $a^2$, with a tread, B, molded to fit therein and united thereto by cement under pressure, substantially as and for the purposes described.

2. In a carriage-step, a metallic plate provided with a panel, $a^1$, and an exterior wall, $a^2$, and a tread, B, cemented to said plate within the wall, whereby the cement forming the union between the plate and tread is protected upon its edge by the metal wall, substantially as described.

3. The combination of a metal supporting-plate provided with a recess or panel, $a^1$, and the exterior wall, $a^2$, with a tread, B, provided with the extension or lip $b^1$, adapted to lap upon the wall $a^2$ and to cover the vertical joint between the inner face of said wall and the tread, all substantially as described.

4. The combination of a molded tread, B, provided with the portion $b^2$, shaped to fit a recess in a metal plate specially prepared to receive it, with said metal plate A, provided with a recess, $a^1$, and a continuous supporting-surface, all substantially as and for the purposes described.

5. A metallic carriage-step provided with the exterior wall, $a^2$, integral therewith, and a continuous tread-supporting surface or panel, $a^1$, adapted to receive a tread previously shaped to fit it, whereby the panel will provide a continuous surface for the reception of the cement employed in fastening the tread to the step, and the wall will seal the horizontal joint between the tread and cementing-surface of the step, all substantially as and for the purposes described.

FRANCIS A. SAWYER, 2D.

Witnesses:
F. F. RAYMOND, 2d,
GEO. F. WALKER.